United States Patent [19]

Warnaka et al.

[11] Patent Number: 4,991,433
[45] Date of Patent: Feb. 12, 1991

[54] PHASE TRACK SYSTEM FOR MONITORING FLUID MATERIAL WITHIN A CONTAINER

[75] Inventors: Glenn E. Warnaka, State College; Mark E. Warnaka, Howard, both of Pa.

[73] Assignee: Applied Acoustic Research, State College, Pa.

[21] Appl. No.: 410,699

[22] Filed: Sep. 21, 1989

[51] Int. Cl.$^5$ .............................................. G01F 23/28
[52] U.S. Cl. .................................... 73/290 V; 73/149; 367/908
[58] Field of Search ............ 73/290 V, 149; 367/908; 181/123, 124, 139, 140, 402

[56] References Cited

U.S. PATENT DOCUMENTS

| | | | |
|---|---|---|---|
| 2,666,326 | 1/1954 | Poole et al. | 73/149 |
| 3,075,382 | 1/1963 | Mathias | 73/149 |
| 3,118,890 | 11/1963 | Westcott et al. | 73/290 V |
| 3,324,716 | 6/1967 | Roberts | 73/149 |
| 4,145,914 | 3/1979 | Newman | 73/290 V |
| 4,189,722 | 2/1980 | Lerner | 73/290 V |
| 4,433,577 | 2/1984 | Khurgin et al. | 73/290 V |
| 4,535,627 | 8/1985 | Prost et al. | 73/290 V |
| 4,599,892 | 7/1986 | Doshi | 73/149 |
| 4,811,595 | 3/1989 | Marciniak et al. | 73/290 V |
| 4,811,601 | 3/1989 | Tolan | 73/290 V |

Primary Examiner—William A. Cuchlinski, Jr.
Assistant Examiner—C. W. Fulton
Attorney, Agent, or Firm—Daniel DeJoseph

[57] ABSTRACT

Acoustical energy is directed into a vessel containing an unknown volume of fluid at a frequency at or near the Helmholtz resonance of the vessel. The signal generated within the vessel is analyzed to compare its phase relationship to an electrical reference input signal. The volume of fluid in the vessel may then be determined from said phase relationship, such as by previous empirical calibration of the vessel.

21 Claims, 3 Drawing Sheets

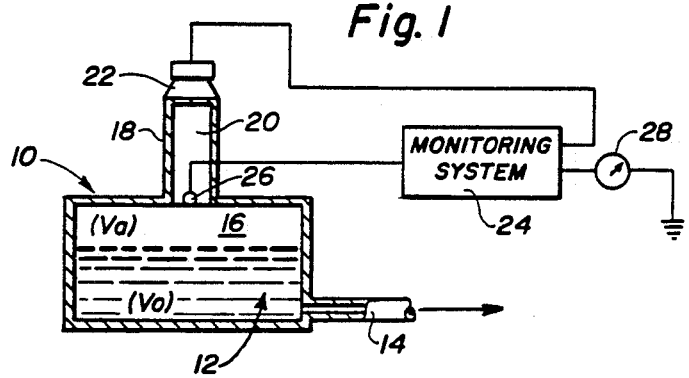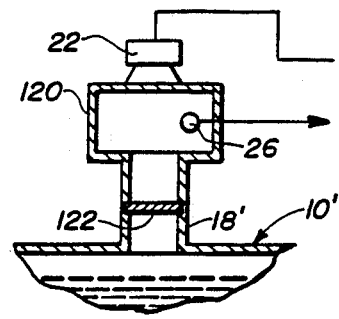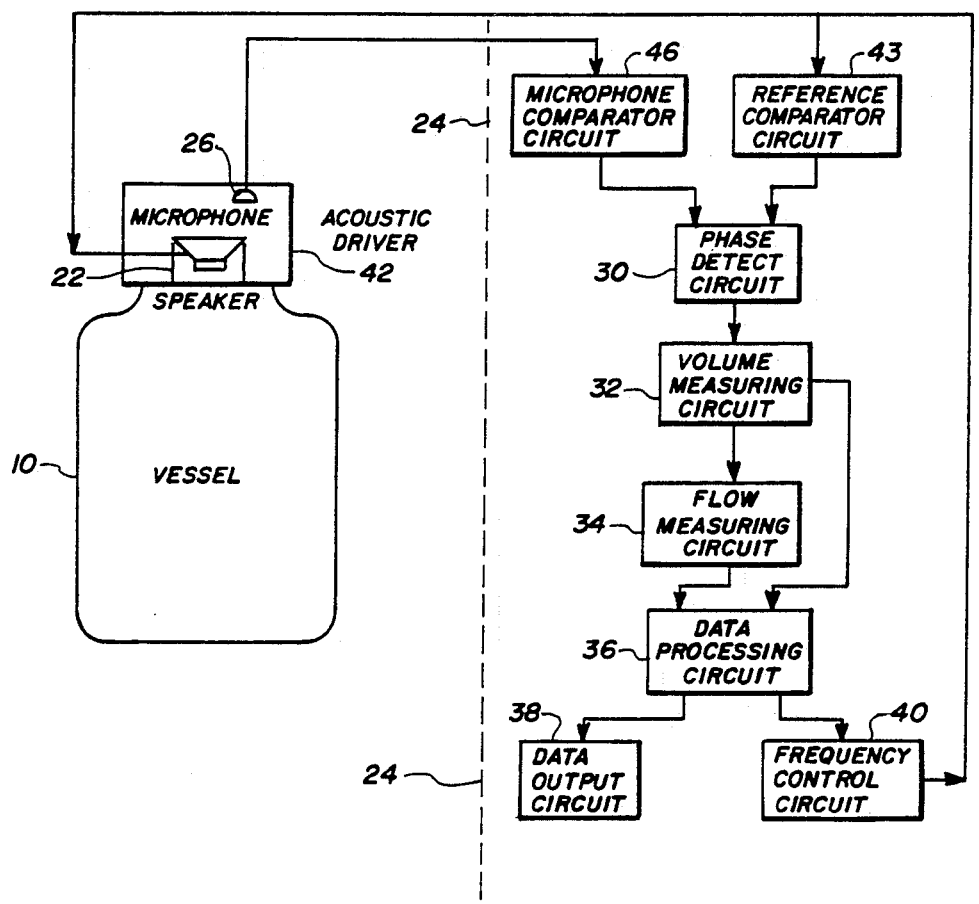

PHASE TRACK SYSTEM FOR MONITORING FLUID MATERIAL WITHIN A CONTAINER

BACKGROUND OF THE INVENTION

This invention relates to the monicoring of fluent materials such as liquids within a vessel, such as a tank, of any size or shape, in order to determine the liquid volume, level or flow rate, measured as the change in volume as a function of time, to or from the tank.

The prior art teaches numerous methods and systems for determining the quantity of liquid or liquid-like materials in a vessel on a continuous, intermittent or occasional basis. Included among such prior art monitoring systems are apparatus for determining liquid level in a tank utilizing, for example, a surface level float, an echo ranging device through which signals are reflected from the surface of the liquid being monitored and electromechanical sensors. In addition to acoustical types of devices utilized for monitoring liquid quantity within a tank, electrical devices have also been devised such as those based on the measurement of electrical capacitance.

One serious problem associated with prior art liquid quantity monitoring systems arises from changes in the orientation of the liquid enclosed within the vessel which can be the result of the vessel being mounted on a moving vehicle whereupon it is subject to acceleration forces. In this case the orientation of the liquid within the vessel to the position of the sensor may vary considerably with a resultant decrease in accuracy.

In an attempt to cope with such problems, acoustical devices utilizing the Helmholtz resonator principle have been proposed, as disclosed for example, in U.S. Pat. Nos. 2,666,326; 3,075,382 and 3,324,716. Generally, the acoustical devices based on the Helmholtz resonator principle involve a tank configuration in which a main cavity is formed within which a liquid body is retained below an air space in communication with a restricted throat passage through which acoustical exciting energy is transmitted from an acoustical source and through which the resulting vibrations are sensed. The geometry of such a resonator configuration determines a cavity resonance frequency for the exciting acoustical energy at which resonance occurs as detected by a microphone mounted in the through passage as explained for example in U.S. Pat. No. 3,324,716 to Roberts aforementioned.

The use of the Helmholtz resonator principle in accordance with the prior art exemplified by the aforementioned prior U.S. Patents, requires a comparison between the sensor outputs of a standard resonator container excited at its known resonance frequency and, a container enclosing an unknown quantity of liquid in order to determine the liquid volume. According to the aforementioned Roberts patent, adjustment of the tank volume is effected until the standard Helmholtz resonator dimension is achieved. Such applications of the Helmholtz resonator principle render the prior art liquid volume monitoring systems relatively limited with respect to installation and application and often inaccurate.

U.S. Pat. No. 4,811,595, incorporated herein by reference, teaches an advantageous utilization of the Helmholtz resonance principal for the purpose of determining the volume of a container. This patent teaches varying the acoustical energy output of a source, e.g. a loudspeaker, in frequency between limits to sweep a frequency band encompassing two cavity conditions which depend on the quantity of a fluent material within a tank that is excited by such acoustical energy. The volume of the fluent material is calculated from the excitation frequency registered during verified detection of resonance conditions, based on abrupt changes in signal characteristics and stored data relating to the geometry of the acoustic sensor arrangement through which the tank interior is monitored. Although this method is very advantageous, particularly when compared to prior art methods, one potential disadvantage is that, among the wide range of frequencies utilized, there may be some that can cause problems to the user, in that they may result in undesired resonance, such as column resonances between the loudspeaker and the surface of the liquid, being realized.

SUMMARY OF THE INVENTION

The present invention utilizes the principal that changes in volume (and, hence, the Helmholtz frequency) within a Helmholtz vessel cause changes in phase characteristics when the vessel is excited at a constant frequency at or near the Helmholtz resonant frequency. The present invention takes advantage of the discovery that, by determining the vessel's phase relationship with that of a known reference input one can determine, virtually instantaneously, the volume of fluid within the vessel. More specifically, according to the present invention acoustic energy is directed into a vessel containing fluent material at a frequency at or near the resonance value of the air volume above the fluent material within the vessel. The resonance or near resonance signal thereby generated is analyzed to determine its phase relationship with that of the electrical reference input signal for a known volume. The volume of the fluent material in the vessel may then be determined by mathematical relationships or by previous empirical calibration of the vessel.

In accordance with the present invention, the contents of a container or tank are monitored by imparting acoustical energy to the container's interior at a frequency at or near the frequency at which cavity resonance occurs in dependence on the quantity of the fluent material in the container. For nearly all containers more than one frequency will be utilized. In such a case, the container is divided into a number of frequency steps, with each step being utilized for a specific range of volume within the container to insure that the frequency utilized is always very close to resonance. As indicated above, one major advantage of choosing the set of frequencies to be used is that certain frequencies that can cause problems in the accuracy of the desired measurements, such as column resonances and other acoustic modes that occur within the air space, can be avoided. As the resonance frequency of a Helmholtz container is an inverse function of the airspace volume so that the container has a lower resonant frequency when empty and a higher resonant frequency when full, the frequency band will accordingly include a lower frequency limit corresponding to that of an empty container.

The source of acoustical energy is generated externally of the container and may be in the form of a loudspeaker or other transducer.

Acoustically generated disturbances or vibrations imparted to the air mass in communication with the air space inside of the container are sensed though an acoustical receiver (e.g., microphone) or transducer from which an input is transmitted to the monitoring system in response to excitation of the interior of the tank by the source of acoustical energy. In one embodiment of the invention, the monitoring system controls the excitation frequency of the acoustical energy source depending upon the volume range within the container.

The signal output of the acoustical receiver or sensor in accordance with the present invention is preferably converted to a square wave and is eventually fed to a phase detect circuit of the monitoring system whereupon it is compared to the output of the reference circuit driving the loudspeaker which has also preferably been converted to a square wave. The volume of the fluid material within the container can be determined by the phase relationship between the two signals according to mathematical models or by a pre-determined relationship, utilizing data stored within the data processor. Such data from which the fluent material volume is calculated is based on the Helmholtz resonator principle pursuant to which the resonance frequency is a function of the vessel geometry and the fluent material volume. The calculating operation of the data processor may, if desired, be extended so as to differentiate the calculated volume with respect to time in order to obtain a readout of flow rate.

According to certain embodiments of the invention, the aforementioned data from which the volume of fluid material is calculated is permanently stored within a memory chip or a microprocessor chip which has self-contained memory capacity for a given type of container installation, such as the fuel system of an automotive vehicle. The tank of such a vehicle is first filled with liquid fuel and then excited by the acoustical energy source at a frequency at or near the tank's resonance frequency for that condition. The acoustical vibrations being emitted from within the tank are detected, and stored as a reference signal. This procedure is continued as the volume of the liquid is decreased incrementally within the tank. Thus, the liquid fuel volume relationship to a specified reference signal stored in memory in order to enable the monitoring system to readout automotive vehicle fuel tank installations in terms of a unit volume of fuel. A similar procedure may be utilized to permanently store data corresponding to other fuel tank installations.

In accordance with another embodiment of the invention, the acoustical receiver or sensor and the speaker are protected against being damaged by the fluid and/or vapors emanating from the fluid by mounting of the sensor and the speaker on an auxiliary cavity portion forming part of the tank configuration, such auxiliary cavity portion being connected by a throat passage to the main portion of the tank with an isolation membrane mounted within the throat passage, if desired.

DESCRIPTION OF THE DRAWINGS

FIG. 1 is a schematic illustration showing a typical installation of one embodiment of the present invention. FIG. 1A is a partial schematic illustration showing a modification of the installation shown in FIG. 1. FIG. 2 is a functional block diagram illustrating the monitoring system in greater detail in accordance with one embodiment of the invention.

DETAILED DESCRIPTION OF PREFERRED EMBODIMENTS

Referring now to the drawings in detail, FIG. 1 illustrates schematically a typical container in the form of a sealed tank 10 enclosing a fixed volume within which a fluent material is confined in the form of a body of liquid 12. The volume ($V_o$) of the liquid body 12 may be varied by either inflow or outflow of liquid through conduit 14. A body of air or other gas 16 fills the tank space above the body of liquid. The tank includes an upwardly projecting neck portion 18 within which a throat passage 20 is formed. The foregoing tank configuration acts as a Helmholtz cavity resonator (as explained in U.S. Pat. No. 3,324,716 to Roberts aforementioned) when its interior is acoustically excited by a source of acoustical energy at a resonance frequency which depends on the mass of air above the liquid body 12. In the embodiment illustrated in FIG. 1, the acoustical energy source is in the form of an acoustical transducer, or speaker 22 mounted on the upper end of neck portion 18.

The fluent material hereinabove referred to as liquid 12 may also include viscous materials and free-flowing particulate solids as well as mixtures thereof having a measurable flow type characteristic forming an interface with the air or other gaseous material filling the rest of the tank space.

Examples of suitable materials that can be measured by the method and apparatus of the present invention include particulate materials such as spherical, irregular granules, powders, pelletized materials, and materials in flake or plate-like form. Liquid-like materials, the volume of which can be measured by the apparatus and method of the present invention, include but, are not restricted to, such materials as pelletized and powdered plastics and rubber, fillers and additives for molding, grain, flour, cereals, ground coal, crushed coal, powdered coal, metal pellets and shot, fertilizer, seeds, sand gravel, stones, concrete mix, carbon and graphite particles and dry chemicals. Some of above-mentioned materials may adhere to the walls of the container due to electrostatic attraction or other forms of adhesion resulting in contamination. The amounts of such materials may readily be measured by this invention, as may such materials in slurry, gel or colloidal form. The excitation frequency of the acoustical energy output of speaker 22 may be under control of a monitoring system 24 as shown in FIG. 1 to which an input is applied from an acoustical vibration sensor in the form of an acoustic receiver, transducer or microphone 26 mounted on the neck portion 18 adjacent its lower end. In accordance with the present invention, the output of speaker 22 is an excitation frequency which is at or near the resonance frequency for a predetermined range of volume $V_o$, which volume ($V_o$) of the liquid 12 is constantly monitored by system 24 to provide a readout through any suitable display or meter 28.

It has been established that the resonant frequency of the exciting energy in the Helmholtz type resonator configuration of FIG. 1 is a function of the air space volume (Va). Accordingly, the resonant frequency is also a function of the liquid volume ($V_o$) since ($V_o$)+(Va)=(Vc), where (Vc) is the fixed volume of tank 10. Thus the excitation frequency of the speaker output will result in a specific phase relative to the reference electrical input which is communicated to the monitoring system means 24 through the sensor 26. From the data stored in monitoring system means 24, the liquid volume ($V_o$) is calculated from the registered phase at a given frequency of excitation for readout through meter 28. By differentiating the liquid volume being calculated with respect to time, the monitoring system means 24 may also provide a liquid flow rate readout.

FIG. 1 illustrates just one particular mounting arrangement for the speaker 22 and sensor 26, with of course other mounting locations for the speaker and sensor being possible. FIG. 1A shows the speaker 22 and sensor 26 mounted on an auxiliary cavity portion 120 of a modified tank configuration 10' in which the main portion of the tank enclosing the liquid body 12 is connected to the auxiliary cavity portion by a neck portion 18'. A membrane 122 within the neck portion separates the auxiliary cavity portion from the body of air and fluid in the main portion of the tank to prevent the transducers from being wetted by fluid within the tank and/or to prevent exposure of the transducers to fumes that may emanate from contained fluid.

FIG. 2 schematically outlines the monitoring system 24 in accordance with one embodiment of the invention. In FIG. 2, Acoustic Driver 42 contains a loudspeaker 22, or other transducer, which sends a signal into vessel 10. This signal excites vessel 10 to resonance, or near resonance. This resonant or near resonant signal is picked up by microphone 26, which in this embodiment is also contained in Acoustic Driver 42, and sent to the Microphone Comparator Circuit 46.

In regard to transducer 22 and microphone 26 which in this embodiment is contained in Acoustic Driver 42, it is understood that a wide variety of devices may be utilized depending upon the frequency band of interest, cost, power requirements and other installation requirements. For example, various loudspeaker devices of the electromagnetic, electrodynamic, piezo-electric, radiation, horn, air-modulated, mechanical or hydraulic activated, electric and electrostatic types may be utilized. As to the microphone, crystal, piezo-electric, ribbon, carbon, ceramic, condenser, electret, moving coil and hot wire types could be used to detect electrical disturbances.

Microphone Comparator Circuit 46 receives the signal from microphone 26 and converts it to a square wave with the same, or nearly the same, zero crossing as the reference signal. Some amplification may be required before conversion to the square wave takes place. The output of this circuit is a square wave that goes to Phase Detect Circuit 30. Reference Comparator Circuit 48 receives the signal from the Frequency Control Circuit 40 and converts it to a square wave with the same, or nearly the same, zero crossing as the original signal. As above, some amplification will be required before conversion to the square wave takes place. The output of this circuit is a square wave that goes to Phase Detect Circuit 30, which uses a digital logic device known as an Exclusive OR gate (XOR). The XOR used has two inputs and one output. The first input is the output from the Microphone Comparator Circuit 46. The second input is from the Reference Comparator Circuit 48. The output of the XOR represents the phase relationship between the Microphone signal and the Reference signal, which is an important aspect of the present invention in that this phase relationship and the frequency of excitation will be utilized to determine the volume of the vessel 10. The phase relationship may be determined by measuring the duty cycle of the XOR output. Volume Measuring Circuit 32 receives the phase data from the Phase Detect Circuit 30, averages the data so that the output is a constant DC level representing the volume of the fluid in the vessel at the particular frequency currently in use. Flow Measuring Circuit 34 receives the volume data from the Volume Measuring Circuit 32 and differentiates it with respect to time to find the instantaneous changes in volume of the vessel 10 for the particular frequency being used. Data Processing Circuit 36 receives data from Volume Measuring Circuit 32 and Flow Measuring Circuit 34 and converts that data to binary numbers using an Analog to Digital converter. This converted data, as well as data on the current frequency in use and data on the size of the container, is used by a Microprocessor to determine the current fluid volume and flow rate of the vessel. The Microprocessor also uses the current volume and flow data to determine if a frequency change is required. This circuit may also be programmed to correct the data with respect to the thermodynamic properties of the fluid being measured. A typical microprocessor circuit may be used. Data Output Circuit 38 receives the current fluid volume and flow rate from the Data Processing Circuit 36 and converts it into a form the operator utilizing the apparatus of the present invention will understand, e.g., ounces, gallons, liters etc, and displays this for the operator. Frequency Control Circuit 40 contains a programmable crystal based oscillator. When a frequency change is needed because of a large change in volume which renders the phase relatively insensitive to further changes in volume, Data Processing Circuit 36 reprograms the oscillator to the correct frequency. The output of Frequency Control Circuit 40 becomes the reference signal and feeds the loudspeaker as well as Reference Comparator Circuit 48.

The number of frequency divisions within any given system will be dependent, to a great extent, on the amount of damping, or energy dissipation, within a system. In a highly damped system, there will be less frequency divisions than in a system that is not as highly damped. Thus, a relatively undamped system will result in small phase frequency bandwidths and thus will require a relatively large number of frequency divisions of the vessel in order to accurately measure the volume thereof from empty to full, or vice versa. In such a system, there will be a comparatively very rapid change of phase within each frequency division as the volume changes and, therefore, one has the capacity, using the phase measurement method of the present invention, to measure the change of volume in such systems with great accuracy.

With regard to the excitation frequency which is directed into the container, it should be noted that the phase varies rapidly as a function of frequency when the frequency is in the vicinity of resonance but becomes asymptotic to the bounding values of 0° and 180° when the frequency is away from resonance. Hence it is difficult, though certainly not impossible, to utilize phase variations of greater than ±45° about the resonant frequency. Therefore, the excitation frequency should be selected accordingly.

Although it is anticipated that the present method may be utilized to monitor fluent volume within, for example, static tanks as well as tanks mounted in moving vehicles, it is understood that the utilization of the method of the present invention is not to be limited to such embodiments. For example, the present invention can be utilized to measure the rate of flow of a liquid material within a pipeline. This can be accomplished by constructing a chamber or hollow section in the pipeline in accordance with the method of the present invention. The liquid passes through the chamber in which, according to the method of the present invention, measurements are made of volume of the space above the flowing liquid, which volume is easily correlated to the level of flow of the liquid, in that the level of liquid will be high when the flow is large thus making the volume above the flowing liquid small. Alternatively, when the flow is small, the level of the liquid will be low, and thus the volume above the flowing liquid will be large. Optionally, the chamber may be separated from the pipe by various flow controlling devices such as wiers, orifices, venturis, etc.

The foregoing description is to be construed as illustrative only, and further modifications and alternate embodiments of the invention will be apparent to those skilled in the art.

What is claimed is:

1. A method of monitoring an unknown volume of a fluent material within a container, having a specific resonance frequency at a given volume, which comprises directing acoustical energy at an excitation frequency at or near the Helmholtz resonance frequency of the container into the container, sensing acoustical vibrations emitted therefrom having phase characteristics, and measuring the phase relationship of the acoustical vibrations relative to a reference electrical input, and determining the unknown volume of the fluent material within the container based on the thus measured phase relationship for the excitation frequency utilized.

2. The method of claim 1 wherein the container includes a resonator cavity within which the fluent material is confined and a throat passage through which the acoustical energy enters into the cavity.

3. The method of claim 1 further comprising the step of differentiating the calculated volume of the fluent material with respect to time to determine the flow rate of the fluent material with respect to said container.

4. The method of claim 1 wherein the specific excitation frequency directed into the container will be chosen depending on the volume of fluent material within the container.

5. The method of claim 4 wherein the container is divided into a number of fluent material volume ranges for which the excitation frequency utilized will differ.

6. The method of claim 1 wherein the container is attached to a vehicle capable of moving.

7. The method of claim 1 wherein the container is situated to receive liquid flow from and discharge said liquid flow into a pipeline.

8. The method of claim 7 wherein the rate of flow of the liquid in the pipeline is calculated from the volume of liquid within the container.

9. A system for monitoring the quantity of fluid material within a container having a specified resonance frequency for a given volume, said system comprising means for directing acoustical energy into the container at an excitation frequency at or near the resonance frequency of the container, means operatively mounted on the container for detecting acoustical vibrations having phase characteristics, said acoustical vibrations being emitted from said container while said acoustical energy is directed into said container, comparison means operatively connected to the detecting means for determining the phase relationship of the acoustical vibrations to a reference signal, and data processing means operatively connected to said comparison means for calculating the volume of said fluid material as a function of the registered phase relationship for the excitation frequency utilized.

10. The system of claim 9 wherein the means for directing said acoustical energy into the container comprises a speaker device.

11. The system of claim 9 wherein the means operatively mounted on the container for detecting acoustical vibrations therein comprises a microphone.

12. The system of claim 9 wherein said container includes a resonator cavity within which the fluent material is confined and a throat passage portion through which the acoustical energy is directed into the cavity at the excitation frequency.

13. The system of claim 9 further comprising auxiliary cavity means connected in spaced relation to the resonator cavity by the throat passage portion for mounting both the source of acoustical energy and the sensing means.

14. The system of claim 10 wherein said speaker device is operatively connected to the ,data processing means.

15. The system of claim 14 wherein the specific excitation frequency directed into the container will be chosen depending on the volume of fluent material within the container.

16. The system of claim 15 wherein the container is divided into a number of fluent material volume ranges for which the excitation frequency utilized will differ.

17. The system of claim 9 further comprising means for differentiating the calculated volume of the fluid material with respect to time to determine flow rate of the fluid material with respect to said container.

18. The system of claim 9 wherein the comparison means is a digital logic device known as an Exclusive OR gate.

19. The system of claim 9 wherein the container is attached to a vehicle capable of moving.

20. The system of claim 9 wherein the container is situated to receive liquid flow from and discharge said liquid flow into a pipeline.

21. The system of claim 20 wherein the rate of flow of the liquid in the pipeline is calculated from the volume of liquid within the container.

* * * * *